United States Patent [19]

Beer et al.

[11] Patent Number: 4,775,457

[45] Date of Patent: Oct. 4, 1988

[54] METHOD FOR TREATING CRUDE OIL SLUDGES AND THE LIKE

[75] Inventors: Gary L. Beer; Ying H. Li, both of Plano, Tex.

[73] Assignee: Atlantic Richfield Company, Los Angeles, Calif.

[21] Appl. No.: 84,596

[22] Filed: Aug. 12, 1987

[51] Int. Cl.$^4$ .............................................. C10G 17/00
[52] U.S. Cl. ..................... 208/13; 208/299; 585/240; 44/61; 110/346
[58] Field of Search ................ 208/13, 299; 585/240; 44/61; 110/346

[56] References Cited

U.S. PATENT DOCUMENTS

| | | | |
|---|---|---|---|
| 1,634,514 | 7/1927 | Rial et al. | 208/13 |
| 1,726,280 | 8/1929 | White | 208/13 |
| 1,864,755 | 6/1932 | Osmer et al. | 208/13 |
| 1,889,932 | 12/1932 | Emmerich | 208/13 |
| 1,896,583 | 2/1933 | Hoover | 208/13 |
| 2,199,841 | 5/1940 | Rohmer | 208/13 |
| 2,223,934 | 12/1940 | Barnes et al. | 208/13 |
| 2,897,054 | 7/1959 | Miley | 208/13 |
| 3,716,474 | 2/1973 | Hess et al. | 208/13 |
| 4,014,780 | 3/1977 | McCoy | 208/13 |
| 4,144,162 | 3/1979 | Edgar et al. | 208/13 |
| 4,159,683 | 7/1979 | Hughes et al. | 110/346 |
| 4,194,454 | 3/1980 | Lalanne et al. | 110/346 |
| 4,337,711 | 7/1982 | Bolton | 110/346 |
| 4,376,108 | 3/1983 | Lowiciki et al. | 208/13 |
| 4,398,477 | 8/1983 | Iwasaki | 110/346 |
| 4,417,976 | 11/1983 | Sander et al. | 208/13 |
| 4,568,271 | 2/1986 | Mallek | 585/240 |
| 4,618,735 | 10/1986 | Bridle et al. | 44/61 |
| 4,686,048 | 8/1987 | Atherton et al. | 208/13 |

Primary Examiner—H. M. S. Sneed
Assistant Examiner—Helane Myers
Attorney, Agent, or Firm—Michael E. Martin

[57] ABSTRACT

Crude oil sludges and other relatively heavy hydrocarbon liquid sludges are mixed with diatomaceous earth or perlite to form a friable and flowable solids mixture which is conveyed to a combustion unit, such as rotary kiln, calciner or lift pipe type combustor, wherein combustion of the hydrocarbons is carried out to provide gaseous combustion products and a substantially hydrocarbon free solids mixture. The solids discharged from the combustion unit may be recycled for use in the mixing process to reduce the sludge to a friable material for introduction to the combustion unit and excess solids may be discharged for disposal.

6 Claims, 1 Drawing Sheet

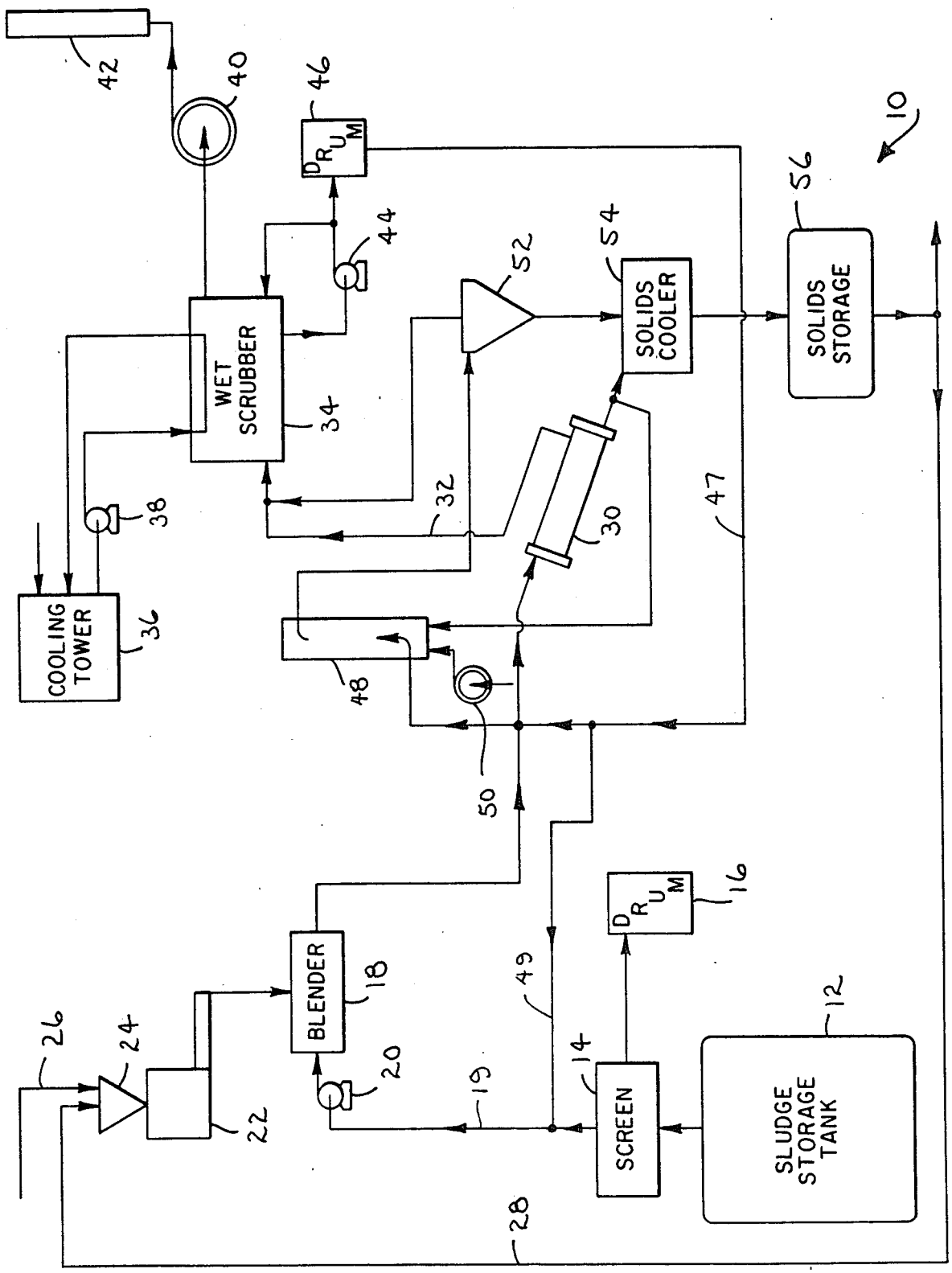

METHOD FOR TREATING CRUDE OIL SLUDGES AND THE LIKE

BACKGROUND OF THE INVENTION

1. Field of the Invention

The present invention pertains to a method and system for treating crude oil and other heavy hydrocarbon sludges wherein a filler material, such as diatomaceous earth, is mixed with the sludge and the sludge is incinerated or otherwise oxidized in a rotary kiln or calciner-type apparatus to provide a friable hydrocarbon free solids substance which may be recycled for use with the sludge at the input to the process.

2. Background

Certain types of hydrocarbon sludges are difficult to process for disposal purposes, such as crude oil sludges resulting from refinery processes, tanker ballast treatment systems, oil spills and other sources of compositions of crude oil and solids. Many sludges of the aforementioned type have sufficient quantities of solids, such as earth materials, metal scale and other materials as to prevent their disposal by incineration through atomization in a combustion chamber. These sludges may originate from processes which do not justify elaborate capital equipment systems, but yet pose hazards to the environment which prohibit their direct disposal without treatment.

Our U.S. patent application filed Dec. 19, 1986, Ser. No. 06/944,644 and our U.S. patent application Ser. No. 07/084,641 filed of even date herewith and entitled "Treating Sludges and Soil Materials Contaminated with Hydrocarbons" are directed to methods and systems for handling hydrocarbon sludges which include both crude oil and more volatile hydrocarbons. The systems disclosed in the abovementioned applications are also more suitable for disposal of large quantities of sludge materials on a continuous basis.

Many crude oil sludges and similar heavy hydrocarbon sludge materials cannot be subjected to conventional incineration because such sludge processes form clinkers or substantial scale buildup in the incinerator apparatus, particularly when such sludges cannot be atomized in a combustion chamber. However, in accordance with the present invention, a process and system have been developed for handling crude oil sludges and other heavy hydrocarbon sludge materials which maintains the sludge material essentially free-flowing and provides a friable mixture which may be directly incinerated to produce gaseous combustion products and a friable solids mixture which may be easily handled and even recycled for use in the process.

SUMMARY OF THE INVENTION

The present invention provides an improved method for handling sludges comprising crude oil and/or other so-called heavy hydrocarbon substances and solids of earth materials, metal scale and other material in such quantities or particle size which prohibits or makes difficult incineration by atomized combustion of the sludge mixture or prevents disposal of the sludge mixture by other conventional processes.

In accordance with an important aspect of the present invention, crude oil and other heavy hydrocarbon sludges are mixed with an adsorbent material, preferably an earth material, such as diatomaceous earth or perlite, and oxidized in an incinerator or calciner to produce gaseous combustion products and a friable solids material which is substantially hydrocarbon free and may be recycled for mixture with the incoming sludge stream or otherwise disposed of in an environmentally acceptable manner.

In accordance with another important aspect of the present invention, there is provided a system for handling crude oil and similar types of hydrocarbon sludges, wherein the composition of the sludge is changed to a somewhat friable, but flowable substance by the addition of an absorbent solids material, such as diatomaceous earth or perlite to the sludge mixture in a blending or mixing apparatus, followed by injection of the mixture into a rotary kiln or calciner or lift pipe-type combustion apparatus to produce gaseous combustion products and friable substantially hydrocarbon free solid material. By using filler materials, such as diatomaceous earth or perlite, the hydrocarbon free solids may be disposed of directly to the earth or reused as sludge filler material.

Those skilled in the art will recognize the abovedescribed features and advantages of the present invention together with other superior aspects thereof upon reading the detailed description which follows in conjunction with the drawing.

BRIEF DESCRIPTION OF THE DRAWING

The drawing FIGURE is a schematic diagram of a system for incinerating crude oil and other heavy oil sludges in accordance with the present invention.

DESCRIPTION OF A PREFERRED EMBODIMENT

In the description which follows, like parts are marked throughout the specification and drawing with the same reference numerals, respectively. The drawing FIGURE is in schematic form and certain elements are shown by conventional symbols for such elements. Representations of conduits for conducting materials from one treatment step or device to the next are simplified in the interest of clarity and conciseness.

Referring to the drawing FIGURE, there is illustrated a system 10 for treating crude oil sludges containing substantial amounts of crude oil, water and solids materials which may include substances, such as sand, sediments and metal scale having particle sizes up to about one inch. Crude oil spills, tanker ballast water treating operatins and certain refinery operations produce crude oil sludges and other relatively heavy hydrocarbon sludges which cannot be incinerated directly by atomization in a combustion chamber or by discharge into a combustion apparatus, such as a lift pipe, fluidized bed or rotary kiln or calciner. Prior efforts to treat such sludges by direct combustion of the sludge material often results in "clinkering" and substantial scale-like build up of hydrocarbon materials in the incinerator apparatus. However, the process of the present invention contemplates the use of the system which treats the sludge material by blending quantities of an adsorbent, friable solids material such as diatomaceous earth or perlite with the sludge prior to performing an incineration process.

The system 10 includes a sludge storage tank 12, a premixing screen 14 and a storage drum 16 for handling oversize solids which are coated with the crude oil or heavy oil sludge material. Sludge of a predetermined solid particle size is conveyed from the screen 14 to a blender 18 by way of a conduit 19 and a pump 20. Solids material is mixed with the sludge entering the blender 18 and is supplied to the blender by a feeder unit 22 having a suitable storage hopper 24 associated therewith. Solids, such as diatomaceous earth or perlite, are supplied to the hopper 24 from a makeup source 26 and solids which have been treated by the process of the present invention may be recycled to the hopper 24 through suitable conveying means 28. A substantially thickened mixture of sludge and adsorbent filler material, as aforedescribed, is conveyed from the blender 18 to a combustion unit such as a rotary kiln or calciner 30 for combustion of the hydrocarbons adsorbed by the solids filler and adsorbed by or coated on the solids present in the sludge prior to the blending process. The kiln or calciner 30 may be of a type commercially available, wherein oxidation of the material injected into the kiln or calciner is carried out in such a manner that gaseous combustion products are discharged through a conduit 32 to a wet scrubber 34 for removal of any entrained fines material which may have been discharged from the combustion unit with the gaseous combustion products.

The wet scrubber 34 is supplied with cooling fluid from a cooling tower 36 by way of a circuit including a pump 38 for condensing water vapor and other combustion products which are condensable at relatively high temperatures and ambient pressure conditions. The cooling tower water flow circuit to the scrubber 34 or a similar source of water may be modified to provide a direct water spray to quench hot gases and entrained fines in the scrubber. Gaseous combustion products suitable for discharge into the atmosphere are conveyed from the wet scrubber 34 by way of a fan 40 to a stack 42 for discharge to the atmosphere or to further treatment, if required. Solid fines carried over from the combustion unit 30 to the scrubber 34 are pumped in a liquid slurry by way of a pump 44 to a receiving drum 46. At least a portion of the slurry may be recirculated to the scrubber 34 for injection to aid in the condensation and scrubbing function.

In certain instances, the solids discharged from the combustion unit 30 may require further combustion which may be carried out in a lift pipe-type combustion unit 48, which, as shown in the drawing FIGURE, may be adapted to receive at least part of the feedstream discharged from the combustion unit 30. The combustion units 30 and 48 may also receive slurry material from the drum 46. Combustion and fluidizing air is supplied to the lift pipe 48 by a fan or blower 50 and the fluidized material, together with gaseous combustion products and excess fluidizing air are separated in a cyclone separator 52, wherein fluidizing air and gaseous combustion products are then conducted to the scrubber 34 and separated solids are discharged to a collection vessel or cooler 54 which is adapted to receive substantially hydrocarbon free solids discharged directly from the combustion unit 30 also. The cooler 54 may be an enclosed vessel having a water spray arrangement, not shown, for cooling the solids to a suitable temperature, normally about 250° F. or less.

As shown by the circuit arrangement of the system illustrated in the drawing FIGURE, a slurry of solids and condensed liquid discharged from the drum 46 may be circulated to the combustion units 30 or 48 by way of conduit 47. If the slurry from the drum 46 is unsuitable for injection directly to the combustion units 30 or 48 it may be recirculated by way of conduit 49 to conduit 19 for introduction to the blender 18. Moreover, the mixture of sludge and filler material mixed in the blender 18 may be conveyed directly to the combustion unit 30 or, alternatively, directly to the combustion unit 48, depending on the characteristics of the material. Normally, with crude oil sludges, such as are discharged from refinery storage facilities and marine tanker ballast treatment facilities, the combustion unit 30 is operable to provide a friable, substantially carbon free solids composition which is discharged directly to the solids cooler 54. Solids collected in the cooler 54 may be conveyed to a storage vessel 56 and recycled to the feeder 22 by way of suitable conveying means 58. Excess solids not required for mixing with the sludge feedstream may be suitably disposed of, such as by return to the environment if no contaminants remain in the solids mixture.

Normally, the solids discharged from the combustion units 30 and/or 48 are substantially hydrocarbon free and, if comprised of heavy metals, have been oxidized to be oxides of such metals and are therefore usually suitable for discharge to the environment. Of course, the diatomaceous earth or perlite added to the sludge mixture to provide the friable feedstream for the combustion units 30 and 48 are also suitable for discharge directly to the environment.

As an example of the process of the present invention, a sludge comprising approximately 40% crude oil, 40% water and 20% solids by weight is mixed with diatomaceous earth in a ratio of 1.33 pounds of sludge to 1.0 pounds of diatomaceous earth to produce a suitable incinerator or combustion unit feedstream which is delivered to the combustion unit 30 to produce gaseous combustion products and a carbon free, friable solids comprising approximately 48% by weight of the total charge presented to the combustion unit. The carbon free solids are suitable for recycling to the process. One commercially available filler material is Celite 560 diatomaceous earth available from Johns-Manville Company, Denver, Colo.

Although a preferred embodiment of the present invention has been described in detail herein, those skilled in the art will recognize that various substitutions and modifications may be made to the specific embodiment disclosed without departing from the scope and spirit of the invention as recited in the appended claims.

What we claim is:

1. A method for treating sludges containing liquid hydrocarbons and solids fines coated with said hydrocarbons comprising the steps of:

providing a combustion unit including a substantially closed vessel having an inlet, an outlet means for solids and gaseous combustion products;

providing a quantity of an adsorbent, friable solids material;

providing means in communication with the inlet of said combustion unit for mixing said sludge with a quantity of said solids material to provide a flowable and friable composition for conduction to said combustion unit;

mixing said sludge with said solids material to provide said composition at a temperature and pressure condition less than that which will produce a reaction causing clinkering or scale buildup of said hydrocarbons and conveying said composition to said combustion unit;

combusting said composition to convert said composition to gaseous combustion products and a quantity of substantially hydrocarbon free friable solids; and conducting said hydrocarbon free solids from said combustion unit for disposal.

2. The method set forth in claim 1 including the step of:

returning at least a portion of said hydrocarbon free solids to said means for mixing with said sludge to provide at least a part of the solids in said composition.

3. The method set forth in claim 1 wherein:

said solids for mixing with said sludge is selected from a group consisting of diatomaceous earth and perlite.

4. The method set forth in claim 1 including the step of:

passing gaseous combustion products through a wet scrubber to separate solids fines entrained with said gaseous combustion products leaving said combustion unit.

5. The method set forth in claim 4 including the step of:

conductinng a sludge formed of condensed combustion products and solids fines for reentrainment with said composition in said combustion unit.

6. The method set forth in claim 5 wherein:

said sludge formed of condensed combustion products and solids fines is mixed with said sludge and said solids before introduction to said combustion unit.

* * * * *